United States Patent [19]
Davis et al.

[11] Patent Number: 5,784,441
[45] Date of Patent: Jul. 21, 1998

[54] SYSTEMS FOR POWER INTERRUPTION DETECTION

[75] Inventors: Glenn Albert Davis, Lilburn; Mark Wayne Patton, Alpharetta; Douglas Wallace Todd, Lawrenceville, all of Ga.

[73] Assignee: Scientific-Atlanta, Inc., Norcross, Ga.

[21] Appl. No.: 148,198

[22] Filed: Nov. 3, 1993

[51] Int. Cl.$^6$ ............................................. H04M 11/00
[52] U.S. Cl. ........................ 379/106.01; 379/39; 379/40; 379/46
[58] Field of Search .................. 379/106, 107, 379/102, 104, 105, 39, 40, 41, 42, 43, 44, 45, 46, 50, 92, 38, 106.01, 106.03, 92.01, 92.03, 92.04; 340/870.02

[56] References Cited

U.S. PATENT DOCUMENTS

| | | | |
|---|---|---|---|
| 3,128,350 | 4/1964 | Hesselgren | 179/90 |
| 3,466,395 | 9/1969 | Prins | 179/2 |
| 4,241,237 | 12/1980 | Paraskevakos et al. | 179/2 AM |
| 4,455,453 | 6/1984 | Parasekvakos et al. | 179/2 AM |
| 4,682,169 | 7/1987 | Swanson | 379/107 |
| 4,703,325 | 10/1987 | Chamberlin et al. | 340/825.17 |
| 4,741,022 | 4/1988 | Chebra et al. | 379/106 |
| 4,764,952 | 8/1988 | Feliu | 379/107 |
| 4,787,045 | 11/1988 | Storace et al. | 379/107 |
| 5,012,510 | 4/1991 | Schaubs et al. | 379/92 |
| 5,018,192 | 5/1991 | Smith | 379/107 |
| 5,025,470 | 6/1991 | Thornborough et al. | 379/107 |
| 5,029,290 | 7/1991 | Parsons et al. | 340/533 |
| 5,031,209 | 7/1991 | Thornborough et al. | 379/107 |
| 5,079,715 | 1/1992 | Venkataraman et al. | 379/107 |
| 5,097,528 | 3/1992 | Gursahaney et al. | 379/92 |
| 5,157,716 | 10/1992 | Naddor et al. | 379/106 |
| 5,224,157 | 6/1993 | Yamada et al. | 379/106 |
| 5,235,634 | 8/1993 | Oliver | 379/106 |
| 5,300,980 | 4/1994 | Maekawa et al. | 379/106 |
| 5,469,365 | 11/1995 | Diekema et al. | 340/870.02 |
| 5,566,339 | 10/1996 | Perholtz et al. | 379/38 |

*Primary Examiner*—Stella Woo
*Attorney, Agent, or Firm*—Kenneth M. Massaroni; Kelly A. Gardner

[57] ABSTRACT

A method for monitoring a condition, such as the presence of electrical power, at a remote location and for generating a telephone call on to a telephone line that delivers to a central control unit notification of a change in the monitored condition in the form of a set of unique identifying signals. According to the method, the condition is monitored at the remote location and is sensed for changes in the condition from a first state to a second state. Responsive to a change in the condition to the second state, the telephone line is tested and a line availability signal generated. Responsive to indicia of line availability, the line is selectively seized. Signals are generated on to the telephone line representative of a first telephone number to address the first control location, the signals representative the first telephone number correspond to the change in the monitored condition and signals representative of the telephone number assigned to the remote location are generated on to the telephone line by the interexchange carrier network.

36 Claims, 13 Drawing Sheets

5,784,441

SYSTEMS FOR POWER INTERRUPTION DETECTION

FIELD OF THE INVENTION

This invention relates generally to the field of devices that continuously monitor a condition and in response to a change in the condition within preselected parameters, automatically notifies a central location (also referred to as a Headend) of the change. The invention relates particularly to a method and apparatus for monitoring the presence of electrical power, such as residential electrical power service as is provided by public utility systems.

BACKGROUND OF THE INVENTION

Homeowners have come to expect a level of service such that the electric power service to their homes is basically uninterrupted. When power interruptions do occur, homeowners become upset and complaints are often filed with the local public services commissions. The public has come to expect the power companies to know when power is out and when it has been restored. In response to the foregoing, power companies have explored different products that would solve this problem.

One such approach modified the pay-per-view system set-up for cable television viewing. Cable television companies (CATV) have found it difficult to provide enough operators or enough telephone lines to process all of the calls that were generated ten minutes before a movie or other special events started. The problem was solved by completely automating this process. A system was developed that allowed the movie buyer to order a movie without human intervention. With this system a customer could order a movie by dialing a particular telephone number and the telephone network delivers to the CATV company the caller's phone number and the digits that were dialed. The cable television computer determines, by the caller's telephone number, which addressable converter box to unscramble, and by the digits dialed, which movie or event to process. This calling information is delivered to the cable company's computer by the telephone network before the first ring. The call duration is only as long as the recording that notifies the customer that their movie has been ordered.

A system for notifying an electric utility of the location of a power outage based on the foregoing has been tested by a power company. The customers were given a telephone number that when dialed, delivered the power company the caller's telephone number and the digits dialed. No busy signals were received and no operators were necessary. Callers were identified by their originating telephone number.

This approach was not without its inherent drawbacks and disadvantages. For example, the customer had to be at home during the power outage, they had to have the telephone number of the power company and they had to dial that number. The disadvantages of this system become more apparent when one considers that persons on electrically operated life support systems, the elderly, infirm, or children, even if present during an outage, may not be able to complete the process notifying the power company that an outage has occurred. In addition, one can imagine the difficulty in successfully completing a call to the power company in the event of a major power outage when thousands of such calls are all being made almost simultaneously.

Prior attempts to regulate call-in distribution have been less than optimal in that they still result in a large number of calls being attempted in a short period of time, with no ability to regulate the call in period. It would, therefore, be desirable to have units located at the site of the power interruption spread out the distribution of calls in order to maximize the probability that a given call will successfully be completed and to thereby avoid overloading the trunk line.

It would also be useful in the event of a major power outage if the utility company could receive data with respect to which customers had lost power, analyze this data to determine the location of the distribution problems, and dispatch repair personnel to these location to make repairs in a manner that most quickly restores power to the greatest number of subscribers.

Therefore, it is an object of the present invention to provide an apparatus for detecting the interruption of power at a customer location.

Another object of the present invention is to provide an apparatus for detecting the interruption of power at a customer location which is automatic.

It is yet another object of the present invention to provide an apparatus for detecting the interruption of power at a customer location that without customer action, notifies a central location of the outage.

A still further object of the present invention is to provide an apparatus for detecting the interruption of power at a customer location that automatically identifies the location that is experiencing service supply difficulties.

A still further object of the present invention is to provide a power interruption detection system that not only notifies a central location of a power outage, but also automatically notifies the central location when power restoration has occurred.

Yet another object of the present invention is to provide a power interruption detection system that accomplishes the foregoing objects and is inexpensive, easy to produce, and reliable.

Still another object is to recognize problems within the power grid by mapping the location of customers reporting power interruption, such as the operation of hydraulic circuit breakers, and to notify the power company of these problems.

Still another object is to report information relating to the power outage in massive calling volumes without jamming or damaging the telephone network.

SUMMARY OF THE INVENTION

To accomplish the foregoing objects, there is provided a method and apparatus for determining the existence of a condition, such as the presence of electrical power at a remote location, such as a residential customer's home, and for transmitting a data signal to a central location or Headend, which is located remote from the customer. According to this method, the remote location is monitored for the presence of the condition at the site. Changes in the condition from a first state to a 15 second state are sensed. In response to a change of the condition to the second state, the telephone line is tested generating a line availability signal. Responsive to a first indicia of line non-availability, the system waits a first predetermined delay period and then retests the telephone line and responsively generates a line availability signal. In response to an indicia of line availability, the line is seized and the Headend is dialed using the telephone network. The telephone network delivers a unique identifying signal in the form of the dialed number identification number to the Headend thus indicating that the condition has changed from the first state to the second state and also delivers the calling number identification, thus indicating location. When the remote location is connected to the Headend, the Headend transmits a first signal to the remote location. Upon receipt of the first signal, the remote location confirms receipt and transmits a second signal back to the Headend, completing the call and allowing the telephone line to be disconnected.

Stated more particularly, in a preferred embodiment of the apparatus of the present invention, a remote unit, one of a plurality of such units in an entire system, comprises electronic circuitry, an interface to an AC power supply and a telephone line. A Headend comprises a central computer and memory storage device and the capability to connect the Headend to the remote unit via the telephone lines. A novel aspect of the circuitry of the remote unit is the isolation interface between the AC power and the telephone line. The remote unit is programmed prior to installation to enable it to select from and to dial one of several telephone numbers, each number corresponding to a particular condition, such as power on (i.e., the remote location has power), power off (i.e., the remote location has lost power), and a heartbeat test (i.e., to periodically inform the Headend, also called the platform, that the remote unit is operating).

The remote unit remains dormant until it senses a change in the power condition. Upon sensing the change the remote unit tests the telephone line for availability, and when available, seizes the telephone line and dials the telephone number corresponding to the sensed condition. When the Headend receives the call it transmits a confirmation tone (e.g., a 300 hertz tone) to the remote unit. Upon receipt of the confirmation, the remote unit then sends a check tone (e.g., a 1,500 hertz tone) to the Headend that indicates that it is, in fact, the remote unit that is calling and not a wrong number. The Headend receives the Automatic Number Identification (ANI) and Dialed Number Identification (DNI) that represents the telephone number from which the remote unit is dialing and the DNIS represents the number the remote unit has dialed. Upon completion of the aforementioned confirmation and check tones, the remote unit is then disconnected from the telephone line, terminating the call. Thus, it will be seen that the particular event which has occurred (power on, power off, heartbeat) causes a corresponding telephone number to be dialed, and upon dialing of the DNI, the Headend is informed thereof.

In the preferred embodiment it is anticipated that a large number of remote units may simultaneously detect the same change in condition, such as a power outage, and that will all attempt to complete a call to the Headend to communicate the changed condition. In order to prevent overloading the telephone network and the Headend, the present invention provides a novel method for spreading out the call initiation over time to prevent such an overload. The method is preferably initiated when a confirmation error occurs (i.e., an incomplete call), causing the remote unit to enter a state 1, and comprises selecting a first random number and storing it in a Random Register, the random number comprising a first time slot within a given first range having a preselected minimum and a preselected maximum time within which to retry the telephone call. The remote unit returns to a wait condition until the first time slot has expired (the remote unit contains a counting/time keeping mechanism). At the first time slot expiration, the remote unit again attempts to call the Headend. If the call is completed, the remote unit receives and sends the appropriate tones and hangs up. If the call is not completed, a second random number is selected and stored, which comprises a distinct second time slot within a given second range of time within which to retry the telephone call. The second time range is preferably (although not mandatorily) longer than the first time range. In this manner, the likelihood of a successful call occurring within the second time range is greater than in the first time range. In the event that the second attempt is unsuccessful, a third random number, time slot and time range is assigned, as before, but with the third time range being preferably (although not mandatorily) longer than the second time range. This unique method provides a flat, rather than a gaussian distribution of calls to the central office switch.

In a second embodiment the remote unit can be programmed by bi-directional communication with the Headend over the telephone line.

In another aspect of the preferred embodiment of the present invention, a novel isolation circuit in the remote unit is disclosed for isolating the telephone line from the AC power line using a power transformer. The circuit presents low impedance to the telephone, while excess power is directed to capacitors to recharge the remote unit. An additional novel circuit simulates an inductor, but is smaller, less expensive than a true inductor because off hook conditions can be monitored directly. Furthermore, in an additional aspect of the preferred embodiment, the remote unit uses an active filter to split the AC and DC components of the telephone system.

BRIEF DESCRIPTION OF THE DRAWINGS

Some of the features and advantages of the invention having been briefly stated, others will appear from the detailed description which follows, when taken in connection with the accompanying drawings in which.

DETAILED DESCRIPTION OF THE ILLUSTRATED EMBODIMENTS

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
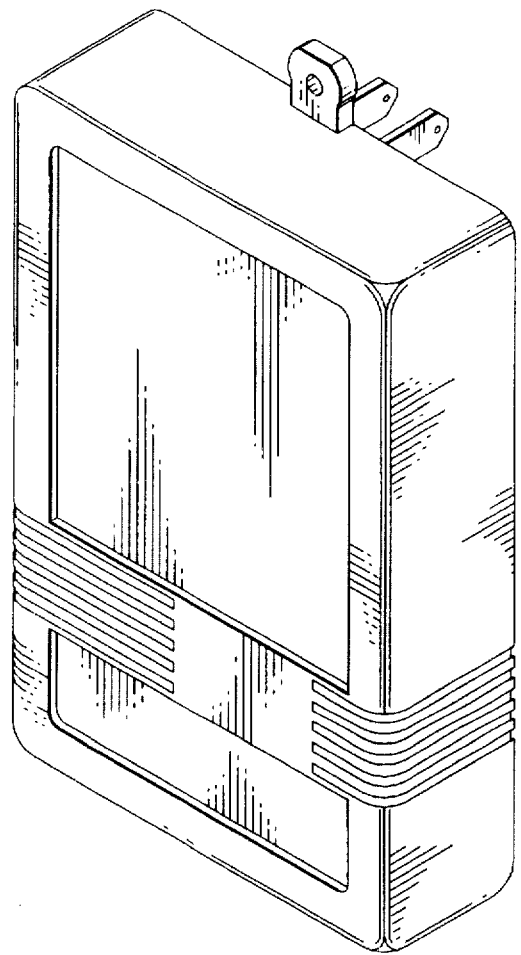
FIG. 1 is a perspective view of the power interruption detection apparatus of the present invention.
Figure 2A:
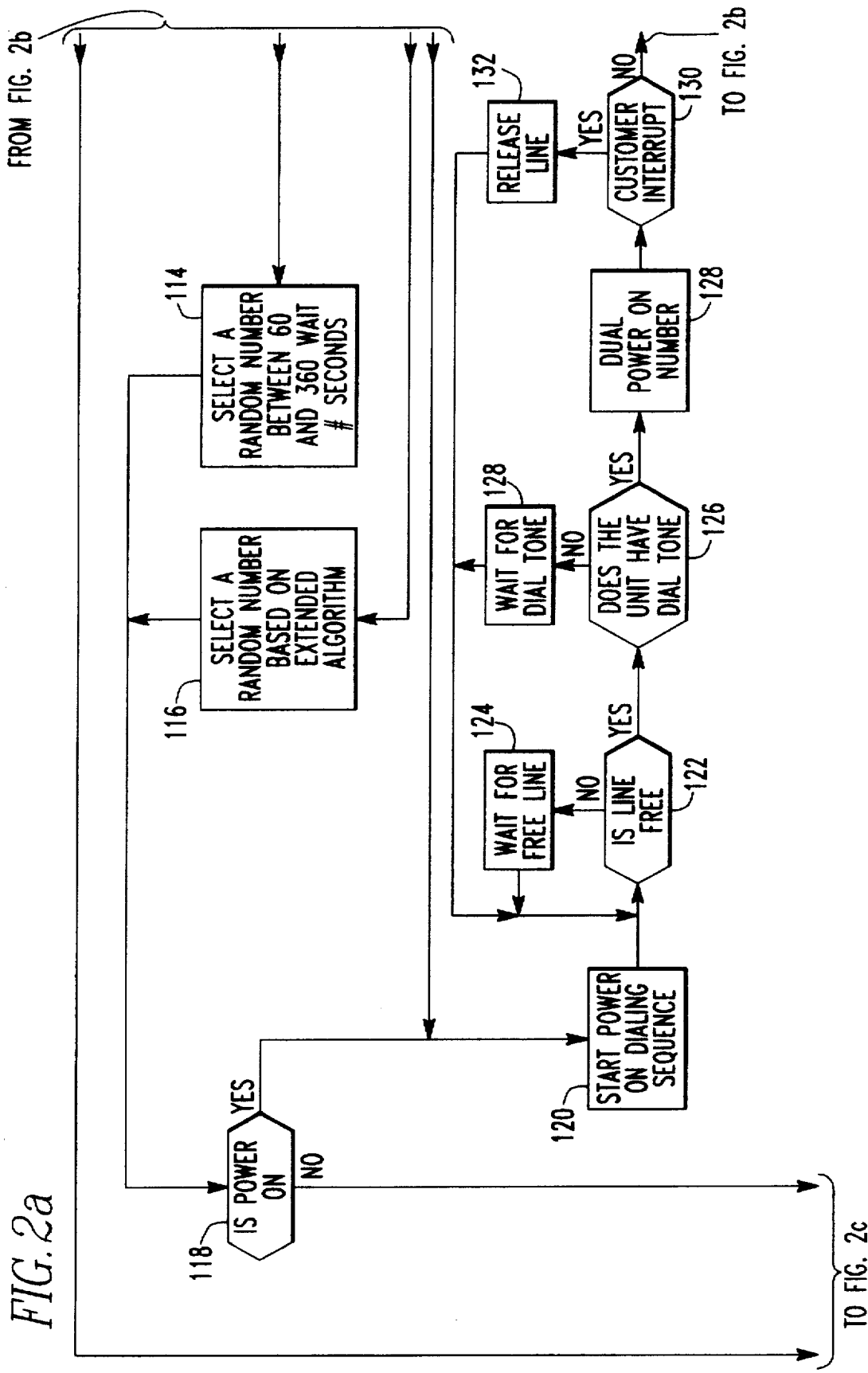
FIG. 2 is a flow diagram of the logic circuitry employed in the power interruption detection apparatus.
Figure 2B:
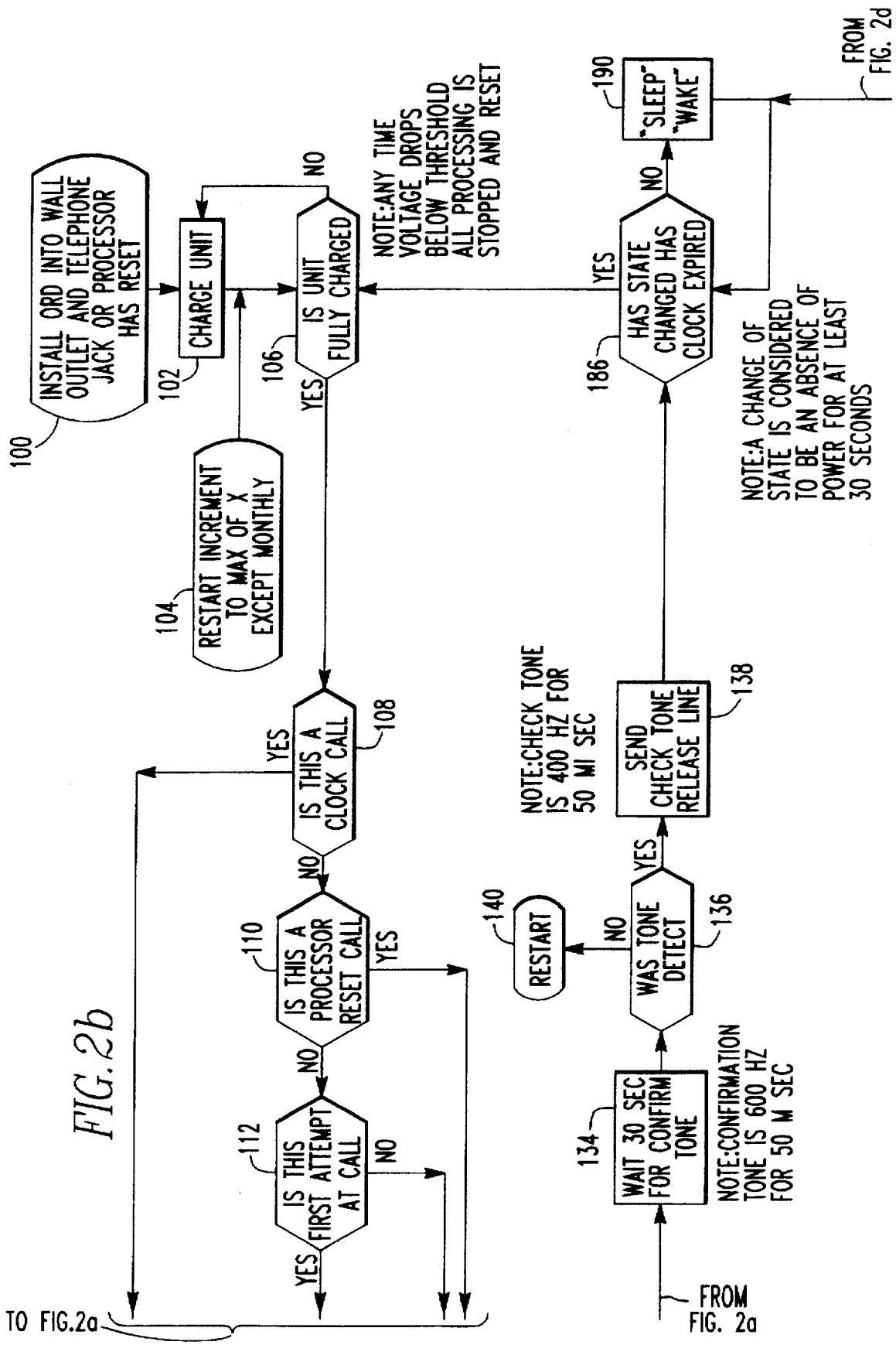
Figure 2C:
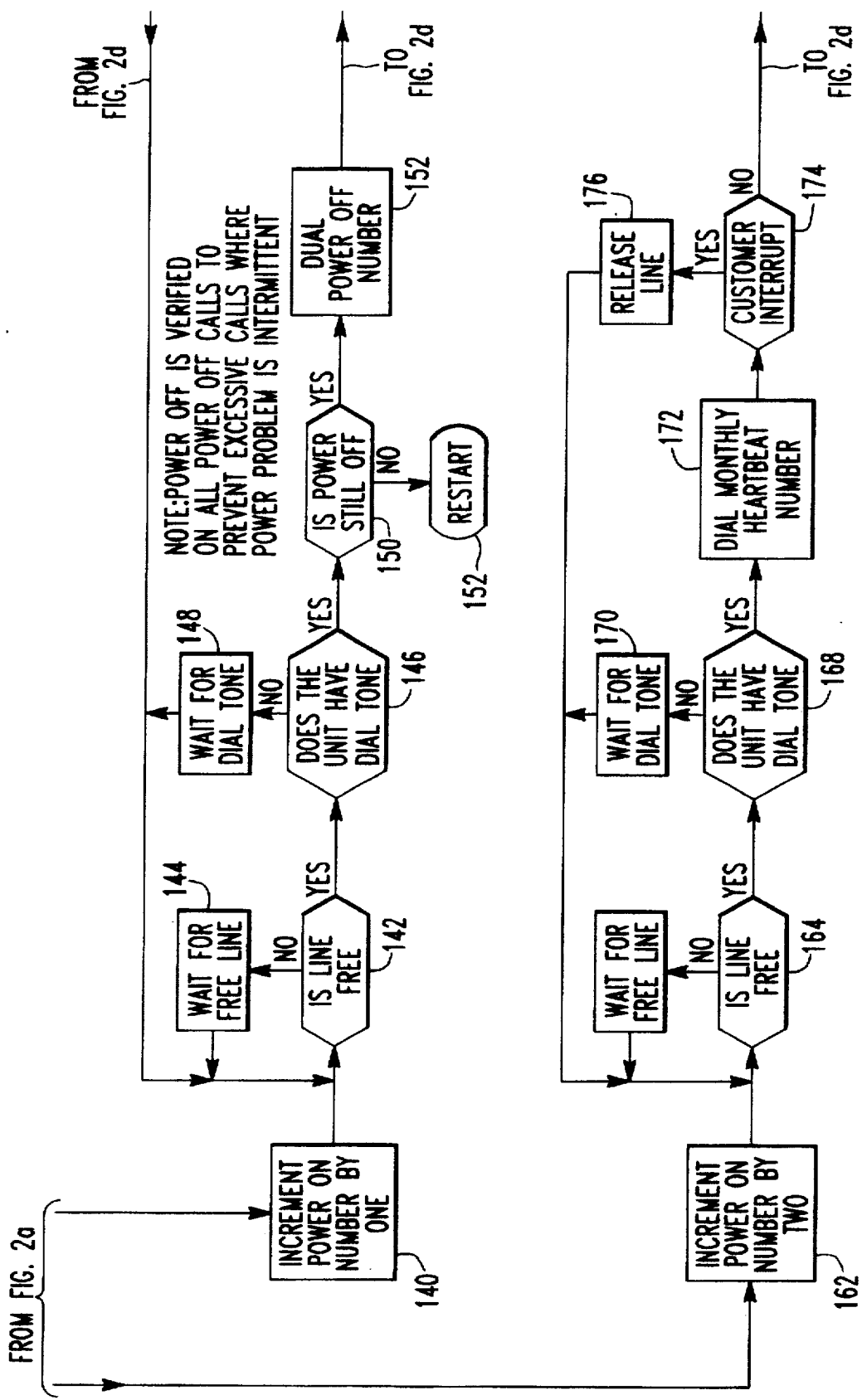
Figure 2D:
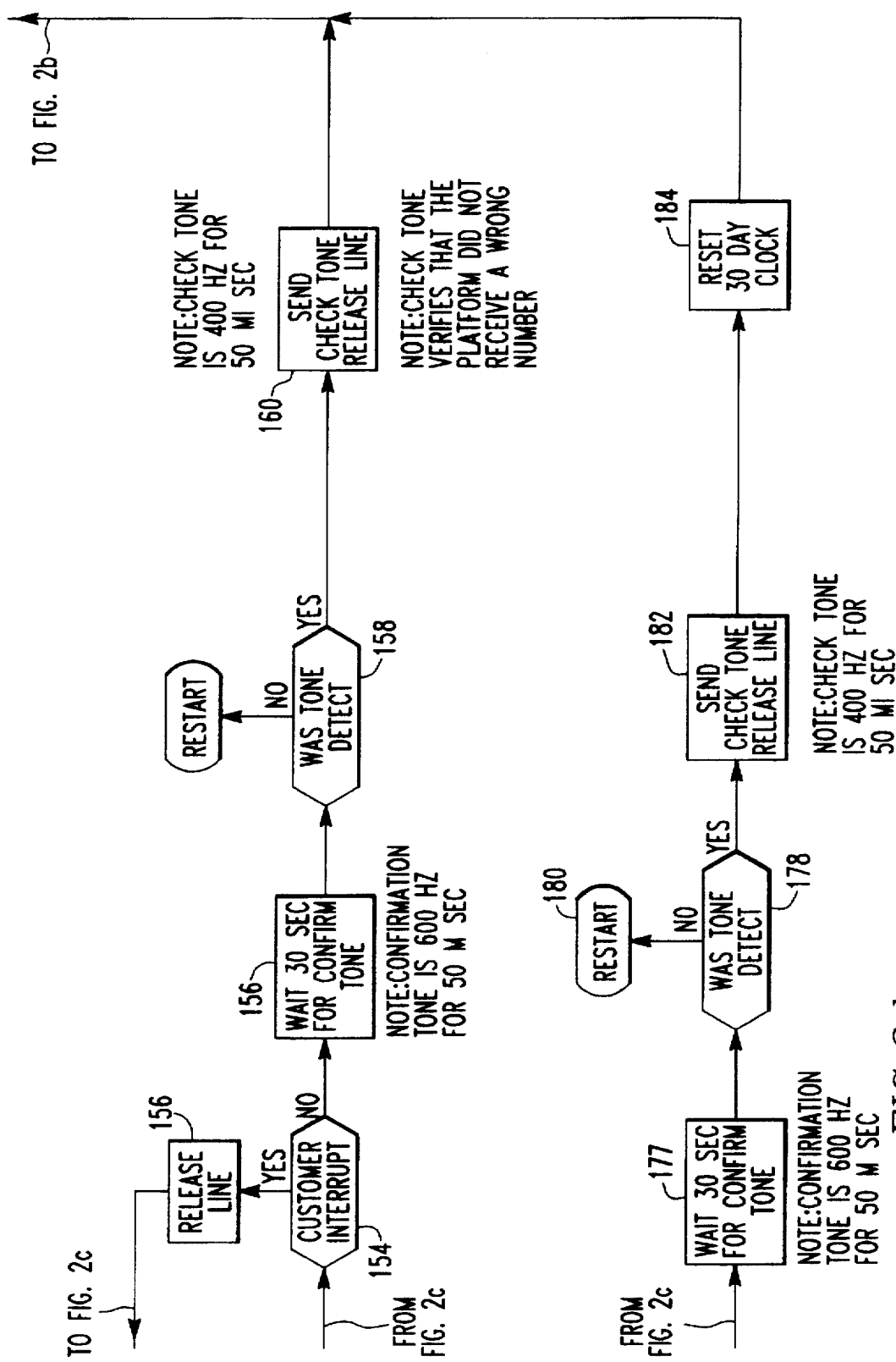
Figure 3A:
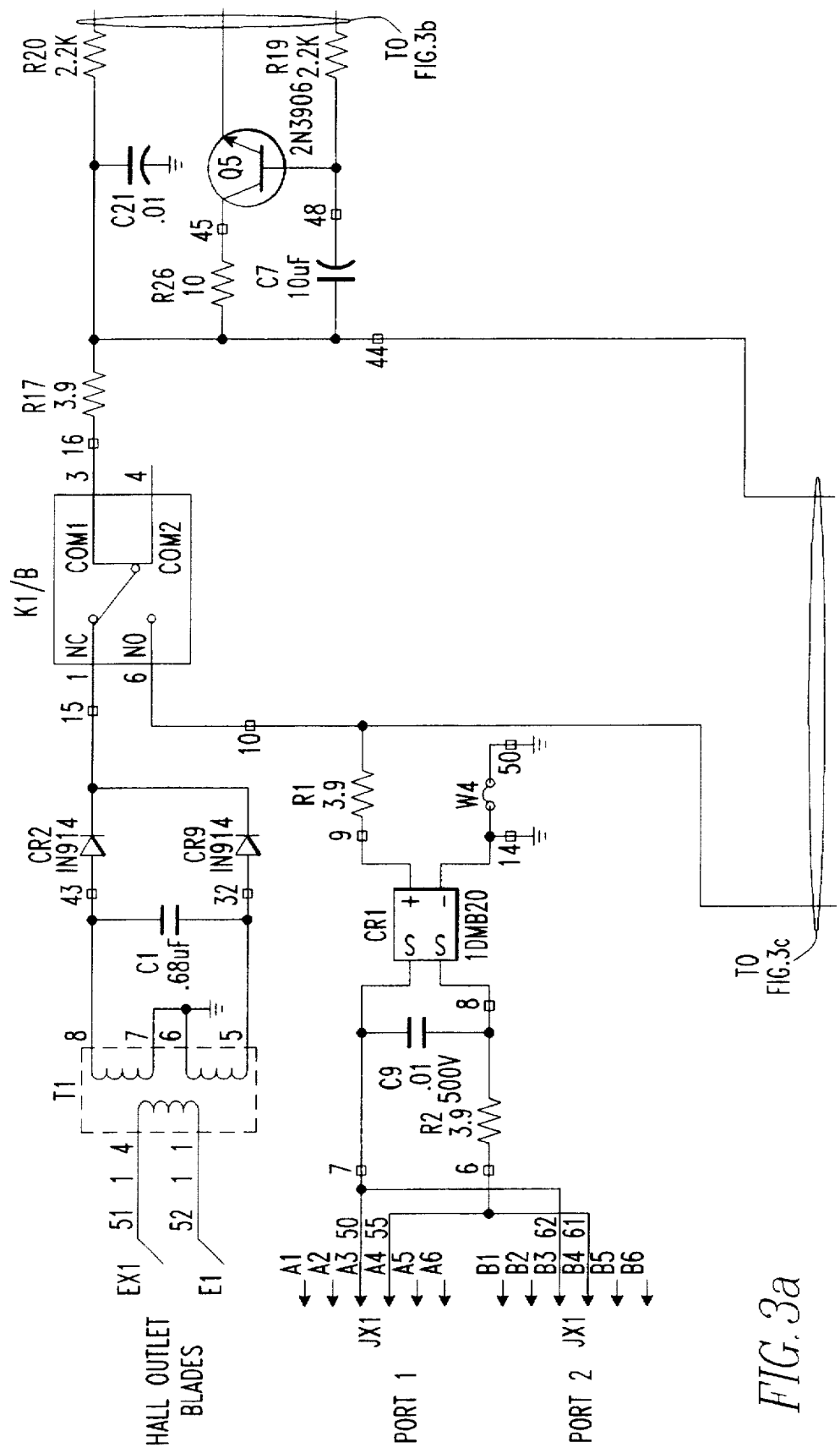
FIG. 3 is a schematic diagram of the electrical circuitry employed in the power interruption detection apparatus.
Figure 3B:
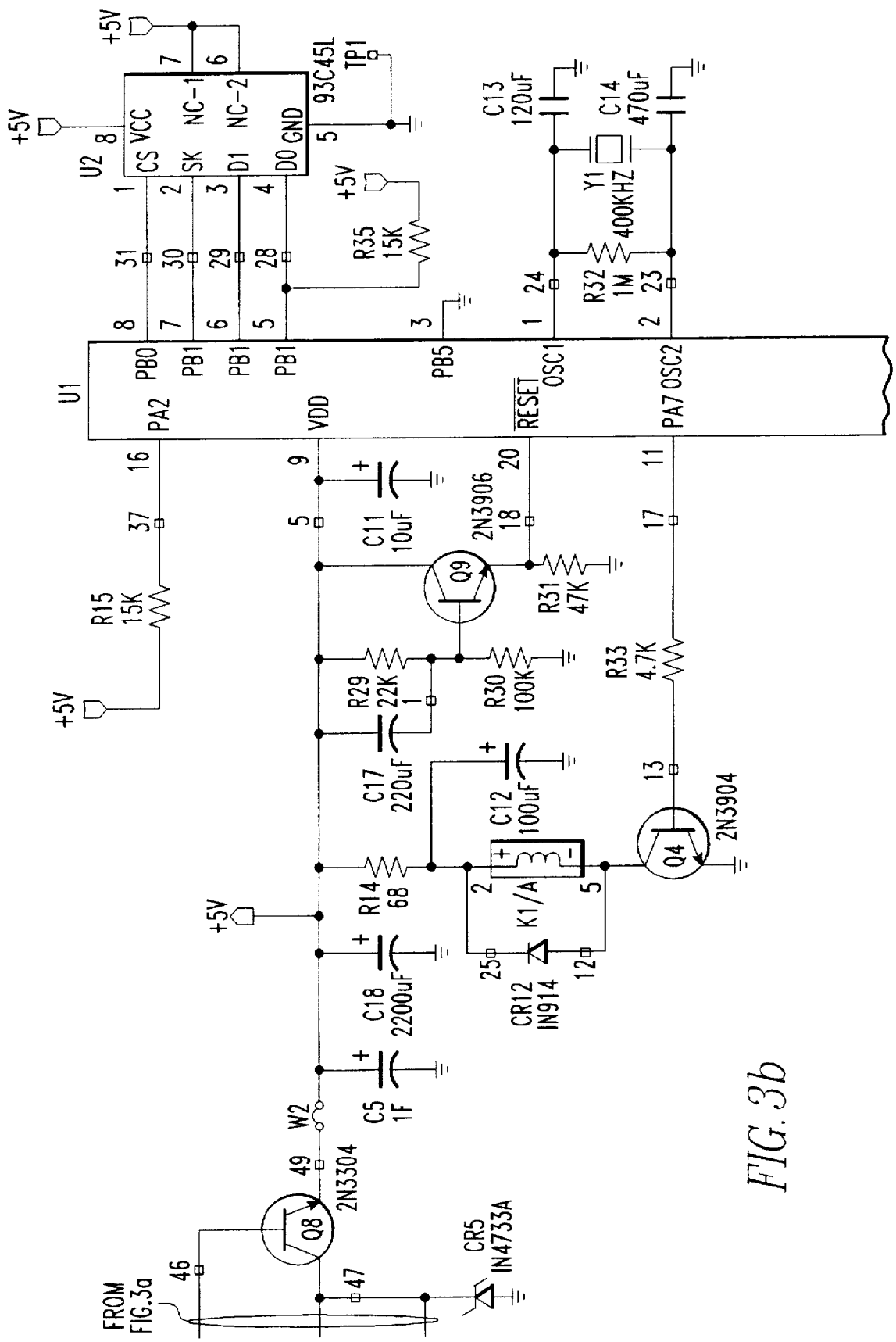
Figure 3C:
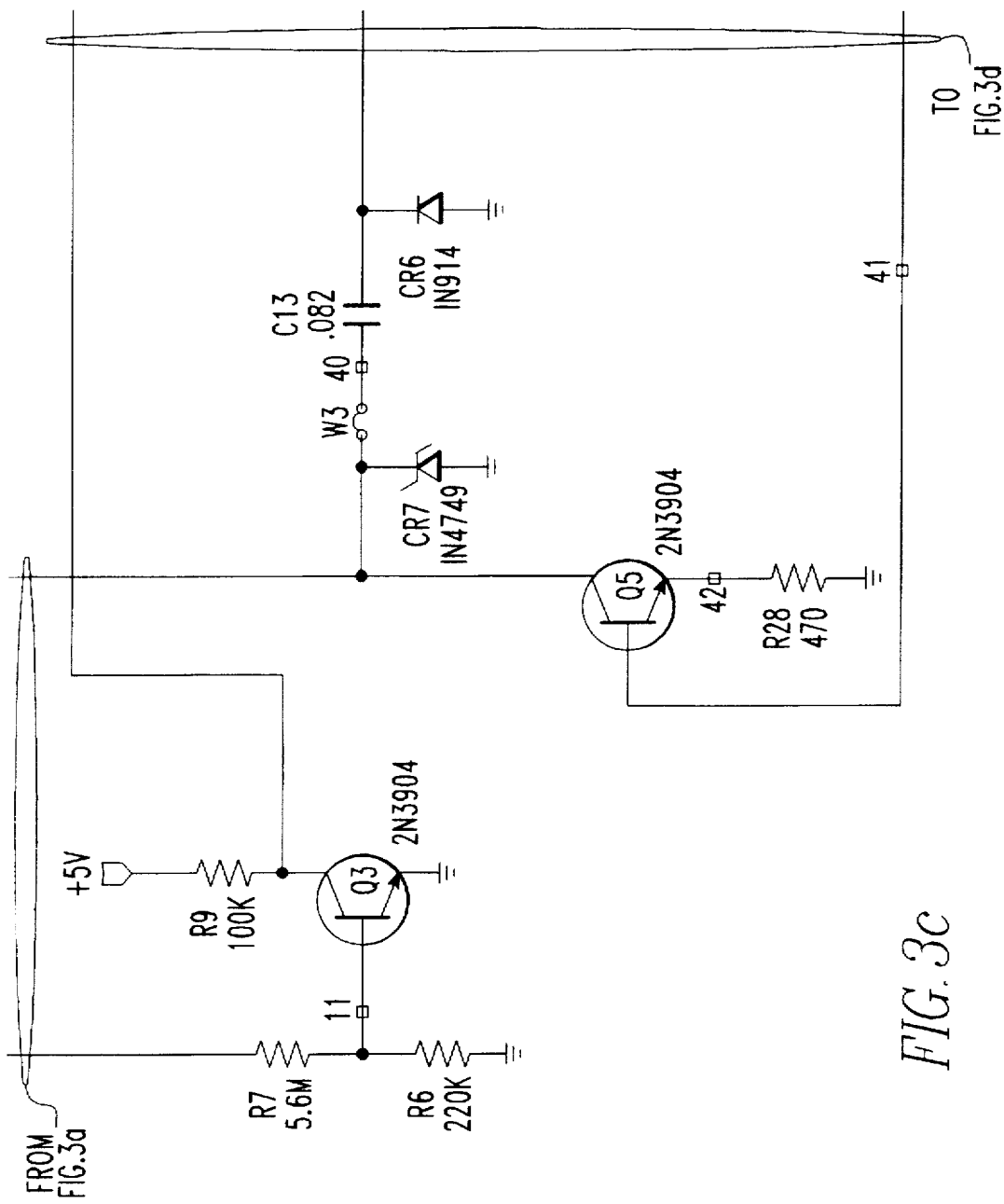
Figure 3D:
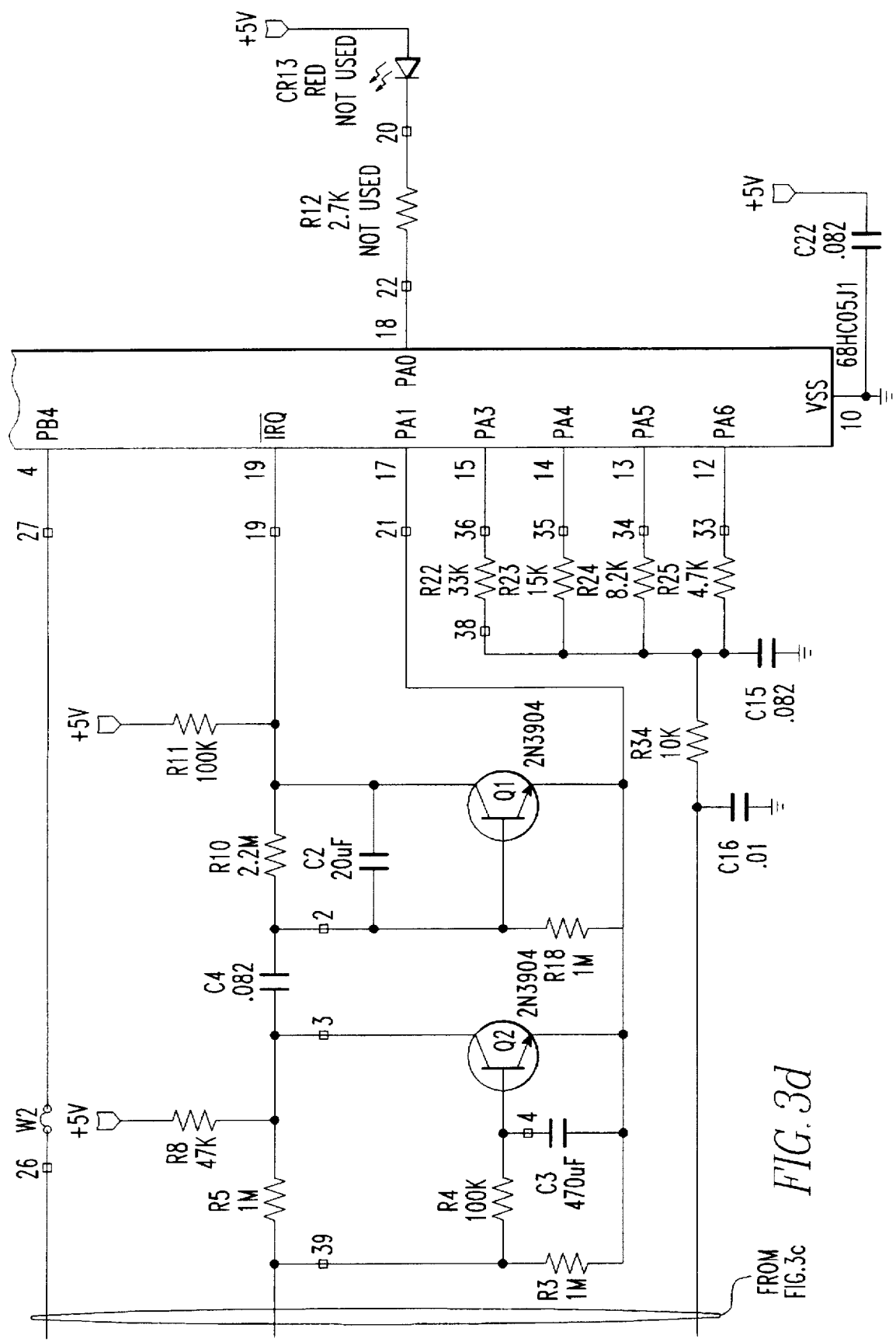

The power interruption detection system of the present invention comprises a Locator Unit that is installed at the remote location; i.e., the subscriber's residence. An embodiment of the Locator Unit is illustrated in FIG. 1. Also provided is a Headend, which in the illustrated embodiment comprises a digital computing apparatus that is installed at a location designated by the utility service provider. The Locator Unit and the Headend, or call processing platform, are adapted to communicate with each other in the event of power outage, power restoration, and check-in, as will be explained in greater detail hereinbelow.

The Locator Unit

Referring now to the logic diagram of FIG. 2 and the circuit diagram of FIG. 3, installation of the Locator Unit is accomplished by plugging the power blades from transformer T1 into a wall socket or other source of power and the telephone jack as indicated at step 100. The Locator Unit then changes from the power supply as shown at step 102. Specifically, power supply capacitors C5, C18, and C19 are charged. The initialization sequence is the initiated by step 104. When the Locator Unit senses that the capacitors are fully charged at step 106, the Locator Unit places a call to the Headend. If the Locator Unit is not fully charged, the placement of a clock call is delayed and steps 102 and 104 are repeated.

Upon confirming that the Locator Unit is fully charged at step 106, the Locator Unit places a call to the Headend. The Locator Unit can call the Headend for a number of reasons. At step 108 if the Locator Unit is placing a clock call for the purpose of periodically identifying the unit as active. This call is usually placed monthly and is referred to as the "heartbeat call". If the call is a processor reset call, then the Locator Unit begins the start power or dialing sequence at step 120. If the call is a first attempt to reach Headend, then step 114 is initiated and the locator selects a random number between 60 and 360 seconds and waits that length of time before taking further action. If the call is not a first attempt to reach the Headend, the Locator initiates a program within the microprocessor that is designed to protect the telephone network. According to this method, the next random number selected, and subsequent random number selections, are prohibited from being a number within the previous dialing window. That is, if the first window or random number range was between 60 and 360, the second random number would not be within this same range and so forth for each dialing sequence. As part of this program, a method of preventing calling peaks, or overlapping numbers, is used.

After the Locator Unit has waited the period of time indicated by either step 114 or step 116, the Locator Unit tests the outlet for a presence of power at step 118. If power has been restored, as indicated by the presence of a voltage of approximately 120 volts at the electrical outlet the power on dialing sequence is initiated at step 120.

The power on dialing sequence 120 is started by making a determination as to whether the telephone line is available for use by the Locator Unit at step 122 and if so, selectively seizing the line. The telephone line may not be available if the telephone is otherwise in use, if the trunk line is overloaded or if the number being dialed is busy. If the line is not available, the Locator Unit waits before checking for line availability at step 124. If the telephone line is available, the Locator Unit inquires as to whether a dial tone is present at step 126. If the line does not have a dial tone, the telephone is assumed to also be out of service and the Locator Unit waits for a dial tone to be present at step 128. When a dial tone is present, the Locator Unit calls the power on number at step 128. Should the communication between the Locator Unit and the Headend be interrupted by the customer or otherwise as indicated at step 130 the line is released as indicated at step 132. At step 130, if the call to the remote terminal is not interrupted, the Locator Unit waits 40 seconds at step 134 during which time it should receive a confirmation signal from the Headend indicating that the Headend and the Locate Units are in communication with each other. If the tone is detected at step 136, the Locator Unit sends an identification signal such as a tone to the Headend and releases the line as indicated in step 138. The identification signal identifies the call as a Locator call. All alarm data is transmitted by the inter-exchange carrier telephone network. The foregoing alarm data consists of the telephone number being dialed, the calling telephone number and a check tone. If the dial tone is not detected at step 136, the Locator returns to the restart sequence of step 104.

Returning now to step 118, if the power is not on, then the power on number is dialed at step 140. Thereafter, the Locator Unit checks for line availability at step 142. If the line is not available, the Locator Unit waits a predetermined amount of time at step 144 before conducting a subsequent line availability check. If the line is available, it is then checked for a dial tone at step 146. If a dial tone is not present, the Locator Unit waits a predetermined period of time at step 148 before re- testing the line at step 142. If a dial tone is present, the Locator Unit checks for a power off condition at step 150. If the power has been restored, the restart sequence of step 104 is initiated at step 152. An indication that the power is still off at step 150 initiates the dialing sequence for the power off number at step 152. If the customer interrupts the call (or for other reasons, the call is interrupted) at step 154 the line is released to the user at step 156 and the process beginning at step 142 of checking for a free line is repeated. If the call to the power on number at the Headend is successfully completed, the Locator Unit waits up to 30 seconds for a confirmation signal verifying the connection at step 156. Receipt and detection of the confirmation signal at step 158 causes the Locator Unit to send its own identification signal to the Headend.

The Locator Unit also performs an additional function. Given that the Locator Unit will be installed at a location remote from the Headend, and further that power outages are not expected to occur infrequently, the Locator Unit is equipped with the capability of periodically checking in with the Headend and thereby informing the Headend that it is installed and operating properly. Conversely, should the Locator Unit fail to communicate with the Headend and deliver the correct signal to the Headend, the Headend can initiate action to investigate whether service or replacement of the Locator Unit is needed. This check is performed each time the Locator Unit places an alarm call of any type. The test is also performed within programmed parameters or every 30 days. At step 108, the Locator Unit determines if the call to be made is a clock call. If so, the power on number is dialed at step 162. The previously described sequence for checking the telephone line for line availability and for seizing the line is then performed. The line is checked for availability at step 164. If the line is not available, the Locator Unit waits for a free line at step 166. If the line is available, the Locator Unit checks to see if a dial tone is present at step 168. If a dial tone is not detected, the Locator Unit waits for a dial tone at step 170. When a dial tone is detected, the monthly heartbeat telephone number is dialed according to step 172. Customer interruption during dialing in step 174 will result in the line being released to the customer at step 176. Completion of dialing will cause the Locator to wait at least 30 seconds at step 176 for receipt of a confirmation signal at step 178 that a connection has been made between the Locator Unit and the Headend. Failure to receive the confirmation tone will initiate the restart sequence of step 104 at step 180. Thereafter, the Locator Unit sends a verification check tone to the Headend and release of the line at step 182. The heartbeat phone call arrives at the Headend, at the front of the phone call is a series of digits which tells the Locate Headend the phone number of the Locator Unit that is calling. These digits arrive in analog or digital form and are provided by the long distance carrier on all 1-800-XXXX numbers when dialed. Along with the ANI (calling telephone number), the DNIS is delivered. The ANI identifies the geographic originating point of the Locator Unit call and the DNIS identifies the type of alarm heartbeat, power on, power off etc. The 30 day clock is then reset at step 184 and the unit "sleeps" or becomes dormant until a change in power state is detected at step 186 or until 30 days elapses at step 190.

Figure 4:
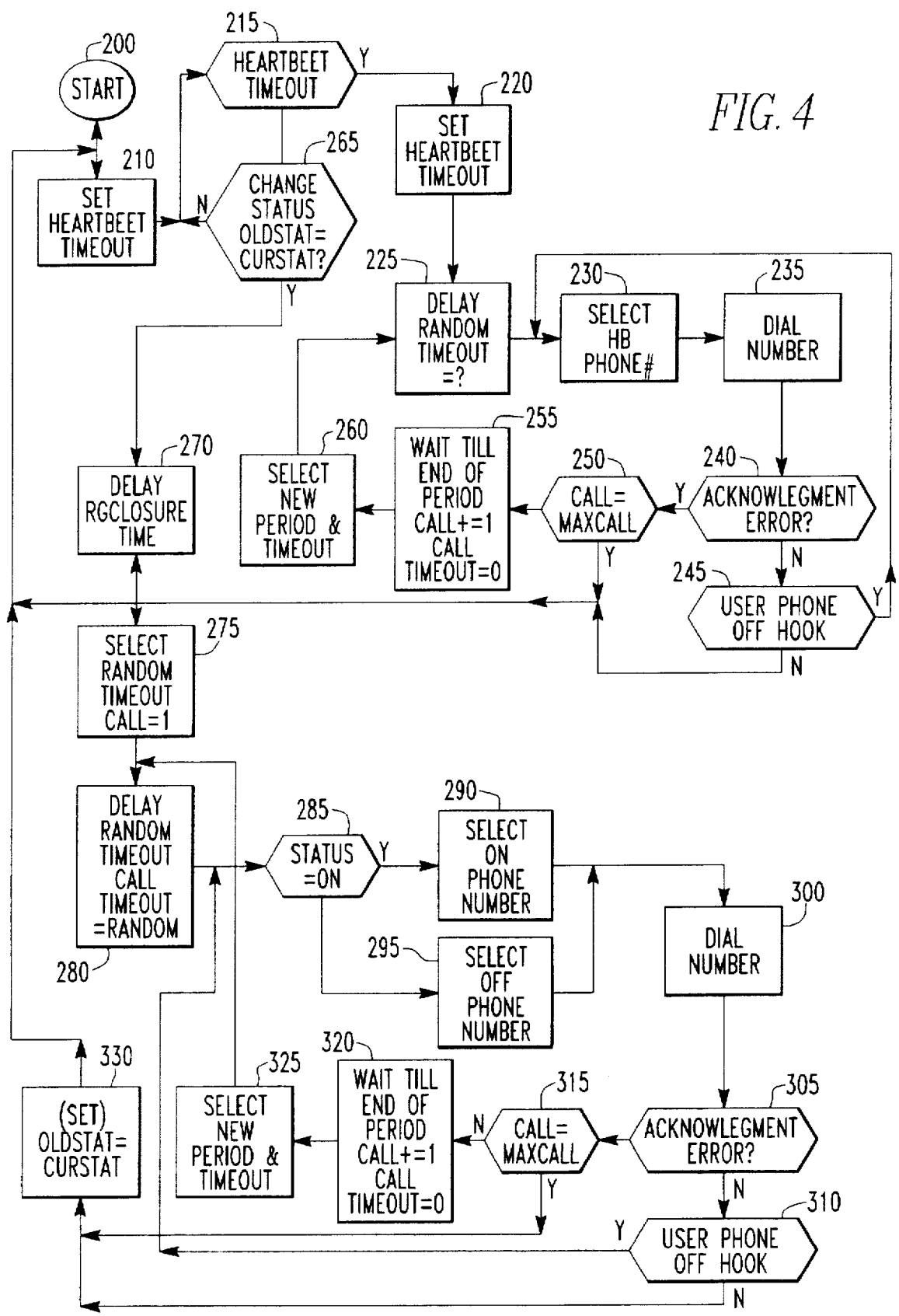
FIG. 4 is a flow diagram of the detailed logic circuitry employed in the Locator Unit's calling function.

A flow chart of the Locator Unit's calling functions is illustrated in greater detail in FIG. 4. At step 200 the Locator Unit is started which includes setting the heartbeat timeout period at step 210. Under normal circumstances, the heartbeat timeout would be set to expire every 30 days. In other words, if there is no call otherwise placed to the central location or the Headend as the result of a power outage/restoration within the 30 day period, the Locator Unit will issue a condition report in the form of a heartbeat call to the Headend. The heartbeat timeout condition is indicated at step 215. If the heartbeat timeout has occurred, the Locator Unit selects a random timeout period at step 220. This time period is randomly selected and is between a preselected minimum time and a preselected maximum time. Step 225 indicates the Locator Unit delaying the randomly selected period of time prior to taking any further action. Upon the expiration of the selected delay time, the Locator Unit selects the HB or heartbeat phone number at step 230 which corresponds to the telephone number at the Headend and will indicate to the Headend that a Locator Unit is making a heartbeat call. The Locator Unit then dials the heartbeat number at step 235 using conventional methods. At step 240 the Locator Unit is either connected to the Headend or an error condition exists. Connection of the Locator Unit to the Headend and successful completion of the "handshake" means that the acknowledgment was sent/received by the Locator Unit and the Headend and that the telephone was not off of its hook at steps 240 and 245.

In the event that the Locator Unit's call to the Headend is not completed, the call must be reinitiated. At steps 250 and 255 the Locator tests to see whether it has exhausted its number of retries. At step 255, it increments its current call number and waits until the end of the delay period. Thereafter, at step 260 a new delay period is randomly selected and is greater than the first delay period, and at the expiration of the time delay at 225, the dialing sequence is re-initiated. Returning now to step 215, if the call is not a heartbeat call, then the call may be a change in status call as indicated at step 265. If there is a change is the status of a monitored condition, the Locator Unit selects a delay time at step 270 during which the Locator Unit is not electrically connected to the red and green (electricity supplying leads of the telephone system). At step 275, a random delay time between the preselected minimum and preselected maximum is selected and at step 280 the Locator Unit delays the randomly selected time prior to any attempt at dialing. At the expiration of the delay time, the Locator Unit conducts a check of the status of the monitored condition, such as electrical power at its installed site at step 285. If the power is on the "power on" telephone number is selected at step 290 and if the power is off the "power off" phone number is selected at step 295. The selected number is then dialed at step 300. At step 305 the Locator Unit is either connected to the Headend or an error condition exists. Connection of the Locator Unit to the Headend and successful completion of the "handshake" means that the acknowledgment was sent/received by the Locator Unit and the Headend and the telephone was not off its hook at steps 305 and 310. In the event that the Locator Unit's call to the Headend is not completed, the call must be reinitiated. At steps 315 and 320 call must be reinitiated. At steps 315 and at steps 320 the locator tests to see if it has exhausted its retries, waits until the end of the current period and increments its try call number and waits until the end of the delay period. Thereafter, at step 325 a new delay period is selected according to the methods described herein, and at the expiration of the time delay at step 280, the dialing sequence is reinitiated. Step 330 is a reset step that resets the heartbeat counter back to its 30 day cycle after the occurrence of a change in the condition which resulted in the Locator Unit making the call to the Headend.

Figure 5:
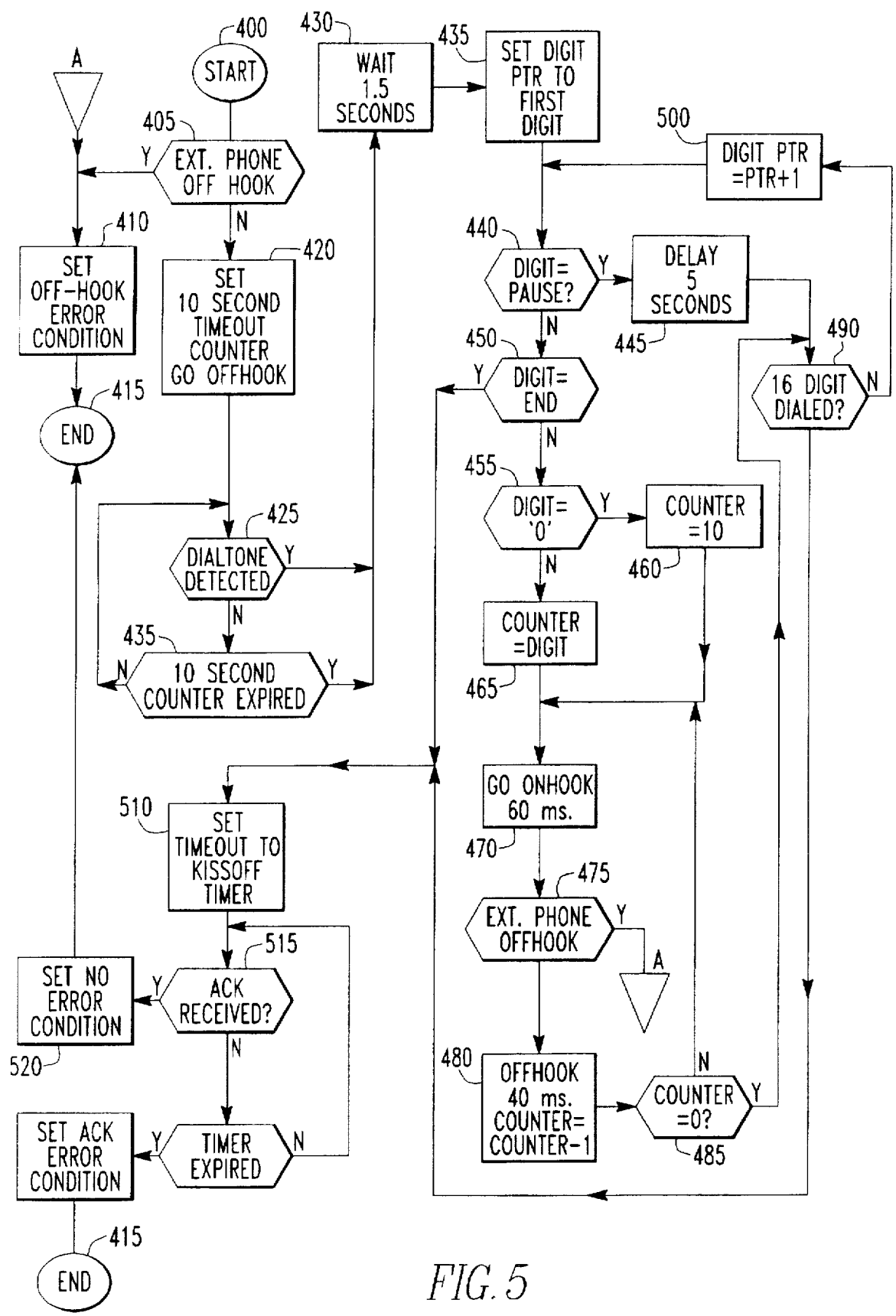
FIG. 5 is a flow diagram of the detailed logic circuitry employed in the actual dialing sequence.

FIG. 5 illustrates in detail the actual dialing sequence and "handshake" routines executed when a phone call is made by the Locator Unit to the Headend.

The sequence is initiated at the Start block at step 400. The Locator Unit first inquires as to whether the telephone is in use, i.e., whether the telephone in an "off hook" condition at step 405. If the telephone is in use, the off hook error condition is set at step 410 and the attempt to dial on this occasion ends at step 415. Alternatively, if the telephone is not in use, the Locator Unit intercepts the telephone line and sets a 10 second delay at step 420 in order for the carrier network to deliver a dial tone to the line. If at any time during the delay period, if a dial tone is detected at step 425, another 1.5 second delay is set at step 430. On the other hand, of no dial tone is detected during the expiration of the 10 second delay at step 435, the Locator Unit again checks for a dial tone at step 425.

When a dial tone is detected and after the 1.5 second delay period at step 430 the microprocessor begins the dialing sequence at step 435. The microprocessor is programmed to dial a telephone number having up to 16 digits. After dialing each digit, the microprocessor confirms that the telephone has remained on the hook. At step 435 the PTR is set to the first digit of the telephone number to be dialed. At step 440, if the digit to be dialed represents a pause, then a 5 second delay is imposed at step 445 prior to the dialing of any subsequent digits. If the digit is not a pause then the microprocessor determines whether the digit is an end flag at step 450. If it is an end marker or end flag, meaning that the entire number has been dialed, then the handshake subroutine is initiated as will be explained hereinbelow. If the digit is not an end flag, then the digit is set to zero at step 455 and the counter is set at 10 seconds at step 460. If the digit is not zero, then the counter is set to the digit at step 465 and the microprocessor goes on hook for 60 ms. at step 470 and reconfirms that during the dialing of that digit no-one has interrupted the call. If the telephone is already off-hook at step 475, an error condition exists and the dialing program must be restarted at step 410. If the telephone is not off-hook, then the telephone is taken off-hook for 40 ms. and the counter is decremented by one at step 480. Steps 470 through 480 are repeated until the counter counts down to zero at step 485. When the counter reaches zero at step 485, the microprocessor confirms that all digits have been dialed at step 490. If all digits have not been dialed, the digit PTR is incremented by one at step 495 and dialing continues. If all digits have been dialed, the handshake routine is initiated at step 505.

The handshake routine begins by setting a timer to the maximum length of time during which the Locator Unit will be connected to the Headend at step 510. Once the connection between the Locator Unit and the Headend has been established, the Locator Unit should receive the acknowledgment from the Headend at step 515. If the acknowledgment is received, the no error condition flag is set at step 520 and the subroutine ends at step 415. If the timer expires prior to receipt by the Locator Unit of the Headend acknowledgment, the acknowledgment error condition flag is set at step 415.

Figure 6:
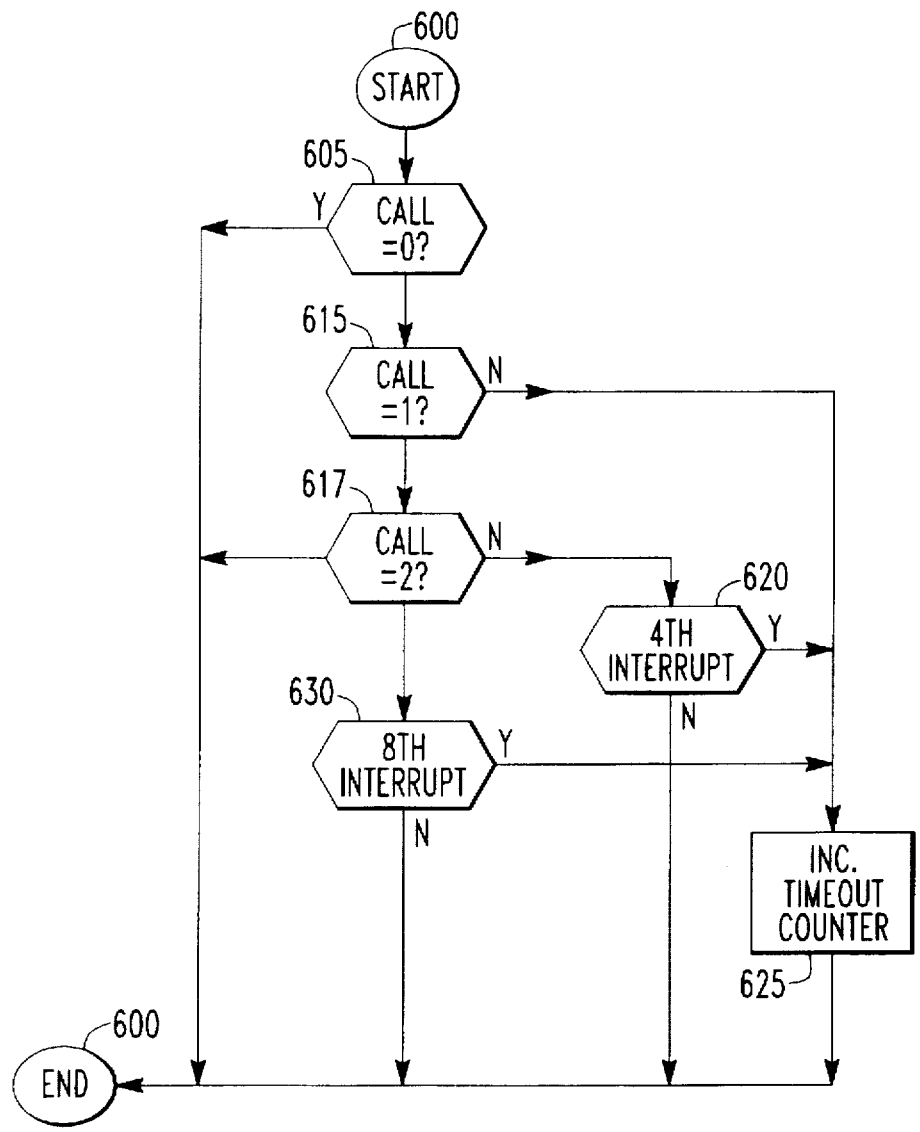
FIG. 6 is a flow diagram of the detailed logic circuitry employed in the delay subroutine.
Figure 7:
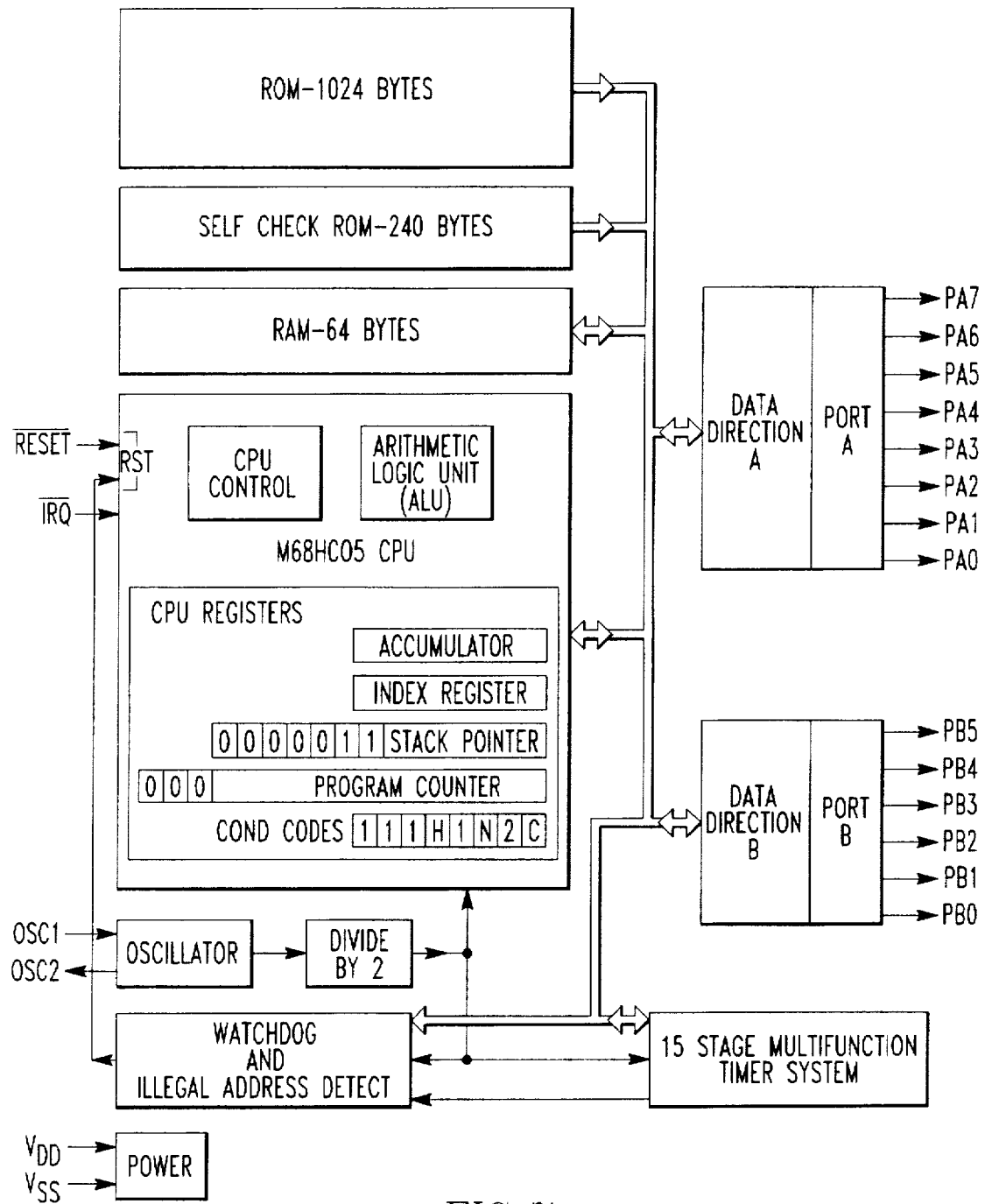
FIG. 7 schematic diagram of the electrical circuitry employed in the microprocessor of the Locator Unit.

FIG. 6 illustrates the delay subroutine (ISR Routine). At step 600 the subroutine is entered. If the call is zero at step 605 no call is pending and the subroutine is exited at step 610. If a call is pending, then step 620 is executed. Steps 605, 615 and 620 are repeated until the forth interrupt occurs at which time the timeout counter is incremented at step 625. If a call is not pending, step 630 is executed until the eighth interrupt occurs. Stated differently, the ISR Routine is entered on the timer interrupt, and is executed every 5.2 milliseconds. This routine increments a timeout counter based on which call, or retry is currently in effect. If the call number is zero, then no calls are pending. If the call number is one (at step 615), then the timeout counter is incremented in every iteration of this routine. If the call number is two (at step 617), then the timeout counter is incremented every fourth iteration of this routine, and if the call number is three or greater, the timeout counter is incremented every eighth iteration (at step 630) of this routine.

The Locator Unit

Referring now to the drawings and more particularly to FIG. 3, the Locator Unit is schematically illustrated. Power is supplied to the Locator Unit in the form of 120 volts ac on lines 1 and 2 of transformer T1. The transformer T1 has a very high impedance secondary winding indicated at 6 and 7. Transformer T1 outputs 20 volts ac unloaded and 5 volts loaded which appears across on line 10 at capacitor C1 which acts to suppress transients appearing at the transformer output. The alternating current signal on line 10 is then input into diode CR2 which acts as a half wave rectifier. The rectified signal, output from CR2 on line 12 is input to relay K-1 which serves two purposes. Its primary function is for dialing and connecting into the telephone system. Its secondary function is to transfer power to the locator unit from the just described transformer rectifier circuit. Following the signal path through relay K1 where it is output on to line 14 and is input into R17, which together with C21 on line 16 form a high frequency filter which serves to reduce transient signals introduced into the system as a result of the act of telephone dialing. The signal output from R17 is the power to be supplied to the Locator Unit. Also connected to line 16 is one side of R26, the other side of R26 being output to the emitter terminal of transistor Q5. The collector of Q5 is connected to the collector of Q8. The base of Q8 is connected to R20 which is coupled to the RC filter on line 16. The emitter of Q8 is connected to C5, a one fared supercapacitor, via line 20 which is held at 5 volts. Capacitors C18 and C19, each one thousand microfarad capacitors are connected in parallel with C5 and the three capacitors supply current slugs, as will be more fully described hereinbelow.

R14 is also connected to line 20. The output side of R14 is connected to capacitor C12 and the coil for K1. Diode CR12 and coil K1 are connected in parallel and have their opposite ends connected at 24. Transistor Q4 has its collector connected on line 24. The foregoing function as a relay driver. The coil for the relay does the dialing and the reader will appreciate that Q4 is the driver that allows dialing to take place, activating the coil of K1 which then contacts transferring the dialing pulses.

A design goal of the Locator Unit was to minimize its steady-state operating current. Since the relay K1 must be closed in order to dial, R4 was connected in series with C12 so that C12 would charge the power supply through R14 when the coil relaxes, allowing the supply voltage at the high side of the coil and the cathode of CR12 to rise to the supply voltage. When Q4 turns on in full, supply voltage is supplied across K1 and C12 discharges causing a voltage drop across R14 and a corresponding decrease in power supply current. R14 and C12 are chosen such that during the dial sequence, a full charge is acquired and is then discharged for the next portion of the pulse.

Also connected to line 20 are C17, R29, Q9, R30, and R37 which together form a re-set circuit in the form of an emitter amplifier. Transistor Q9 is a PNP device connected such that when the power supply voltage is greater than 3.2 volts, sufficient bias is developed at the base of Q9 to turn it on, thus dropping the re-set pulse from the microprocessor. If the power supply voltage begins to drop due to an extended power outage, the transistor Q9 will turn off, allowing its collector voltage to drop to ground through R31 which results in a re-set pulse.

Returning now to the input section of the Locator Unit and specifically the output of R17 on line 16, connected thereto is the collector of Q6. The base of Q6 is connected to W3, as will be explained in greater detail as follows. The output side of W3 is connected to a transistor amplifier circuit comprised of Q1 and Q2 and their associated resistors. This circuit supplies approximately 55 dB of gain. It functions primarily to listen to the tones on the telephone network, but is also used when power is supplied to the locator from the telephone network, which will become clearer as the specification proceeds. The primary function of this circuit is to listen to tones on the telephone network, but is also employed when power is supplied to the unit. The output from the half wave rectifier (R17-C21) passes down line 16 into W3 Through C10 into the base of Q2 where it is amplified, passed on to Q1, amplified again and is output from the collector of Q1 as a 60 Hz square wave into the IRQ line of the microprocessor. By sample testing, for the presence or absence of the 60 Hz square wave, it can be determined whether power is applied to Locator Unit or not.

Turning now to resistors R22, R23, R24, and R25. These resistors are connected in parallel on line 40 and have their opposite ends defining inputs to the microprocessor M at pins 15, 14, 13, 12, respectively. Together with C15, which is connected between line 40 and ground, these resistors define a pseudo-sign generator. It is a crude digital to analog converter so that along with a table stored in the microprocessor M, it is possible to generate a sine wave on to line 40. Resistor 34 has one of its ends connected to line 40 and the other of its ends is connected to one side of capacitor C16 at line 42. The other side of capacitor C16 is connected to ground. Together, R34 and C16 define a second pole of filtering. The filtered sine wave on line 42 is then input to the base of transistor Q6. Modulating the voltage at the base of Q6 will cause a collector current to flow which modulates and is used for sending a tone back to the telephone line.

Microprocessor M is preferably the MC68HC05J1 microprocessor available from Motorola Inc. (Phoenix, Ariz. and is well known to those skilled in the art of designing microprocessor controlled systems. A detailed discussion thereof is not deemed necessary.

The Locator Unit is connected to a pair of RJ11 jacks which are connected to the phone system. A normal telephone system has 48 volts applied the RJ11's which also appears as the voltage across CR1 which is a four-way Wheatstone Bridge circuit. The function of CR1 is to provide proper polarity to the Locator Unit. However, at the time of installation of the Locator Unit, the polarity of the phone system will likely not be known. Thus, the output of CR1 on line 58 will always be a positive voltage, 48 volts if the telephone is off hook and significantly less if the telephone is on hook. Connected to the output of CR1 is R1, the output side of which is connected on line 60. Resistors R7 and R6 are connected in series and together provide the proper base voltage at the base of transistor Q3 which is connected between resistors R6 and R7 and which will be turned on under conditions to be described. The purpose of this circuit is to transmit data to the microprocessor on whether the telephone is in use. For example, if the telephone is not in use, 48 volts will be present at the junction of R1 and R7 (at line 60). This in turn, will bias Q3 on and the collector of Q3 will be the load. Should someone pick-up the telephone or the line be in use, then the voltage output from CR1 will drop to the range of 6 to 8 volts. In this case, sufficient voltage at the output of R1 and R7 would not exist to turn on the base of Q3. Q3 would then be off and the collector biased to 5 volts.

Operation of the Locator Unit

Upon the loss of power, the microprocessor M will have made the determination that a power out phone call to the Headend is required. In order to accomplish this, the microprocessor first monitors the telephone and tests for line availability which is accomplished by monitoring the collector of transistor Q3. A low level at the collector of transistor Q3 indicates that the telephone is not is use. PA7 begins to toggle causing a voltage to be impressed across R33, toggling Q4 on and off. Q4 will toggle at the dial-pulse rate which is 10 pulses per second with a 60/40 duty cycle. When Q4 is on, K1 is activated which will transfer the contacts on to line 60. When the transfer is made, the 48 volts which is normally supplied from CR1 is then presented to the normally open contacts, shorted over to the common contact of the relay and then loaded by zener diode CR5. Current is then supplied from the telephone line which is required in order for the apparatus to determine that dial pulses are occurring. In this case the telephone line current is routed through transistors Q5 and Q8 to replenish the charge on the power supply capacitors C5, C18, and C19. Thus, during the dialing sequence and the entire time the device is on the telephone line, current will be supplied from the telephone line and charging the aforementioned power supply capacitors. The output from relay K1 should be a high AC impedance and a low DC impedance in that the telephone line needs a DC load, but it must see a high AC impedance in order for bidirectional communications can take place.

Taken together, Q5, C7, and R19 form a simulated inductor. C7 and R19 form a low pass filter which delay the bias on Q5 from an AC perspective. DC would charge C7 and allow a current path while AC presented there would cause C7 to look like a low impedance causing Q5 to be a variable impedance and thus, a high impedance to AC. The DC path is emitter to collector of Q5 followed by Q8 which is in a configuration to provide a very low DC loss and this is to minimize the voltage at the input while still being able to replenish the capacitors.

The relay K1B will alternately toggle on and off creating the dial pulses which will alternately load and not load the output at CR1 which satisfies the network requirements in the telephone system. At the period between dial pulses, Q3 is examined to verify that no one has placed the telephone in service during the dialing sequence so that just prior to each closing of the relay K1B, Q3 is monitored. If the collector of Q3 is high, then the microprocessor assumes someone has placed the telephone in service and the Locator Unit terminates its use of the line to allow use of the telephone. At the end of the dialing sequence, the relay K1 is left in the closed position, again supplying current through Q5 and Q8 to charge the capacitors. Q5 presents a high AC impedance. The Headend answers the telephone and transmits a 1½ kilohertz tone through the bridge CR1, through the relay K1B. The tone notes the high impedance at Q5 and is routed to the transistor amplifier at Q1, Q2. The transistor amplifier turns the signal into a square wave which is presented to the microprocessor at PA1 which performs the tone detection. When the tone is detected, the Locator Unit knows that the Headend has answered and that it has completed half of a hand-shake. The remainder of the hand-shake is accomplished by the digital to analog converter (D to A) comprising R22 through R25 and Q6 which generates a 300 hertz tone which is filtered by the R34/C16 filter previously described. The current is modulated at the base of Q6 which turns on Q6 causing current to flow at R17, through the relay and back out of the system. The head end then receives the 300 hertz tone, acknowledges that a machine has answered the call, that the handshake was complete, and hangs-up.

An advantage of the present invention lies in the fact that no data is directly communicated by the remote unit (Locator Unit) because this enables greater flexibility when adapting the present system to different telephone systems which may be installed throughout the world. Many non-United States systems do not support Touch Tone dialing and data communication would require standardization, which would make the remote unit more expensive to manufacture. The passive nature of the unit, i.e., that the act of generating a telephone call causes the ANI and DNI to be received by the Headend after call confirmation is established, permits usage with a number of different systems. The telephone interexchange carrier network is a more universally used system with which to provide data to a central unit or Headend.

The foregoing embodiments and examples are to be considered illustrative, rather than restrictive of the invention, and those modifications which come within the meaning and range of equivalence of the claims are to be included therein.

That which is claimed is:

1. A method of monitoring a condition at a remote location and for delivering via a communications network to a central control location notification of a change in the state of a condition at the remote location, the method comprising the steps of:

sensing at the remote changes in the state of the condition from a first state to a second state;

responding during the second state to the sensed change in the condition to the second state, by delivering via the communications network to the central control location a signal representative of an identifying address (IA) assigned to the remote location;

sensing for a return to the first state the condition at the remote location;

responding to the condition returning to the first state by testing the communication network and generating an indication of line availability when the communications network is available for transmission of signals thereon;

responding to an indication of line availability, selectively seizing a line on the communications network;

generating communications network signals representative of a second IA;

delivering to the central control location the second IA; and indicating the establishment of a completed call between the remote location and the central location by generating onto the communications network a preselected check signal.

2. The method according to claim 1 further including the steps of notifying the central control location of a change in the state of the condition at the remote location by transmitting at the remote locating different signals representative of the IA assigned to the remote location.

3. The method according to claim 1 further including the steps of storing into a data base at the central control location the IA of the remote location; and retrieving from the data base, stored data that corresponds to the IA of the remote location.

4. The method according to claim 1 further comprising the steps of identifying at the central location the IA assigned to the remote location and identifying the type of alarm event by comparing the respective IA transmitted to the central control location against a predetermined reference IA.

5. The method as recited in claim 1 further comprising the steps of:

sensing changes in the electrical power supplied to the remote location from a first state where electrical power is being supplied to the remote location to a second state where the supply of electrical power is interrupted; and responding to the sensed changes in the condition during the second state while the electric power is interrupted.

6. The method as recited in claim 5 further comprising the step of receiving via the communications network a confirmation signal at the remote location acknowledging the delivery of the IA to the central control location.

7. The method according to claim 6 further including the steps of:

providing an indication at the central control location of a change in the state of electrical power at the remote location when the IA is received; and storing the IA of the remote location in a data base at the central control location when the indication of a change in the state of electrical power is provided.

8. The method according to claim 7 further including the step of retrieving from the data base at the central control location stored data that corresponds to the IA of the remote location.

9. The method according to claim 5 further comprising the step of responding by the remote location during the second state to the sensed change in power by delivering via the communications network to the central control location a first unique identifying signal.

10. The method as recited in claim 9 further comprising the step of receiving via the communications network a confirmation signal at the remote location upon receipt by the central control location of the second unique identifying signal.

11. The method according to claim 9 further comprising the steps of:

representing the first unique identifying signal as a first dialed number identification code assigned to the central control location;

representing the second unique identifying signal as a second dialed number identification code assigned to the central control location; and identifying at the central location the state of the electrical power at the remote location by identifying the respective dialed number identification code transmitted to the central control location.

12. The method as recited in claim 5 further comprising the steps of:

sensing by the remote location for a return to the first state; and delivering during the first state to the central control location via the communications network a second unique identifying signal in response to the sensed return to the first state.

13. A method for determining a presence of electrical power, at a remote location, and for transmitting a data signal to a central location remote therefrom over a telephone line connected to a carrier network, the method comprising the steps of:

monitoring for interruption electrical power being supplied to a building at the remote location;

responding to the interruption of electrical power supplied to the building during the electrical power interruption by selectively seizing a telephone line and dialing the central location through the carrier network;

generating by the carrier network a data signal indicating that power to the building is interrupted;

delivering the data signal via the carrier network to the central control location when the central location is being dialed; and transmitting a confirmation signal from the central control location to the remote location upon receipt of the data signal, and providing the confirmation signal as is a tone having a first predetermined frequency.

14. The method according to claim 13 further including the steps of assigning a telephone number to the remote location; and retrieving, from a data base at the central control location, stored data that corresponds to the telephone number of the remote location.

15. The method according to claim 13 further including the step of switching a sensor at the remote location to an inactive state during the power interruption until power is restored.

16. The method as recited in claim 13 further comprising the steps of:

delivering to the central control location with the data signals, signals representative of an identifying address (IA) assigned to the remote location; and generating the IA with the interexchange carrier network.

17. A method for determining the presence of electrical power at a remote location and for transmitting a data signal via a telephone line to a central control location remote therefrom, the method comprising the steps of:

sensing an electrical power interruption at the remote location;

responding to a sensed interruption by dialing the central control location during the electrical power interruption;

indicating a first incomplete call attempt when dialing the central location;

responding to the first incomplete call attempt indication by waiting a first randomly selected delay period having a first preselected maximum time period;

redialing the central location after waiting the first delay period;

indicating a first incomplete call attempt when dialing the central location;

responding to the first incomplete call attempt indication by waiting a second randomly selected delay period having a second preselected maximum time period which is longer than the first preselected maximum time period;

redialing the central location after waiting the second delay period;

indicating a complete call attempt when dialing the central location after waiting the second delay period;

responding to indica of a complete call attempt by transmitting to the central control location a signal indicating an interruption of power at the remote location.

18. The method according to claim 17 wherein the step of selectively seizing includes:

responsively generating a line availability signal to determine an indicia of line availability or line non-availability;

responding to indicia of line non-availability by waiting a first randomly selected delay period between a preselected maximum time period and a preselected minimum time period, retesting the telephone line to determine an indicia of line availability or line non-availability and responsively generating the line availability signal upon an indicia of line availability; and responding to indicia of line availability by seizing the telephone line.

19. The method according to claim 17 wherein the step of selectively seizing includes the steps of:

testing the telephone line to determine an indicia of line availability or line non-availability and responsively generating a line availability signal when the telephone line is available;

responding to indicia of line non-availability by waiting a first randomly selected delay period between a preselected maximum time period and a preselected minimum time period;

retesting the telephone line and responsively generating the line availability signal when the telephone line is available;

responding to indicia of line non-availability after the first delay period by waiting a second delay period that is longer than the first delay period and then testing the telephone line;

responding to indicia of line availability by seizing the telephone line.

20. A method for monitoring the presence of electrical power at a remote location and for communicating over a telephone network data relating to changes in the status of the electrical power, wherein the data communicated indicates a first state where electrical power is present and a different state where electrical power has been interrupted, the method comprising the steps of:

monitoring the electrical power at the remote location;

responding to a change in the electrical power from the first state to the different state by waiting a first randomly selected delay time having a preselected maximum time period;

testing, after waiting the first randomly selected delay time, the telephone network for an indicia of line availability or line non-availability;

responding to indicia of line availability by seizing a line on the telephone network; and transmitting to the remote location via the telephone network after waiting the first randomly selected delay time a signal indicating that the power has changed to the different state.

21. The method according to claim 20 further comprising the steps of:

obtaining electrical operating power from a wall outlet at the remote location;

simultaneously monitoring the electrical power supplied to the wall outlet at the remote location and obtaining operating power therefrom; and switching the source of operating power for the sensor, in response to a change in the remote location's electrical power to the different state to the telephone network.

22. The method as recited in claim 20 further comprising the steps of:

responding to the indicia of non-availability, by waiting a first predetermined delay period that is longer than the first randomly selected delay period.

retesting the telephone line after waiting a second predetermined delay period and responsively generating a second indicia of line availability;

responding to the second indicia of line availability by seizing the line;

transmitting to the remote location via the telephone network data indicating that the power has changed to the different state;

responding to a return of the power to the first state prior to the expiration of the first predetermined delay period, by testing the telephone line and responsively generating a third indicia of line availability;

responding to the third indicia of line availability by seizing the line; and transmitting to the remote location via the communications network data an indication that the power has retuned to the first state.

23. A method of monitoring a presence of electric power at a remote location and for generating a telephone call on a telephone line that causes a data signal to be delivered representative of a unique identifying signal for the remote location in response to changes in the monitored electric power from a first state, in which electric power is present, to a second state, in which electric power is interrupted via a telephone network to locations remote therefrom, the method comprising the steps of:

responding to a change in the presence of electric power to the second state by testing the telephone line and generating a line availability signal;

responding to indicia of line availability by selectively seizing the line;

generating onto the line signals representative of a first control location address at the first control location;

responding to receipt of a confirmation signal by the remote location from the first control location, generating onto the line signals uniquely identifying the remote location;

responding to a return of electric power to the first state by testing the telephone line and generating a line availability signal;

responding to indicia of line availability by selectively seizing the line;

generating onto the line signals representative of a second control location IA to address the second control location;

responding to receipt of a confirmation signal by the remote location from the second control location, generating onto the line signals uniquely identifying the remote location;

responding to the elapsing of a predetermined period of time, testing the telephone line and generating a line availability signal;

responding to indicia of line availability, selectively seizing the line;

generating onto the line signals representative of a third control location to address the third control location; and responding to a confirmation signal from the third control location, generating onto the line signals uniquely identifying the remote location;

whereby identification of the remote location that has experienced a change in the presence of electric power at the remote location is automatically transmitted to the first control location, identification of a return to the first state is automatically transmitted to the second control location, and a signal indicating that the monitoring device is active is periodically transmitted to the third control location.

24. An apparatus for monitoring electric power at a location remote from a control location and for delivering notification of a change in the status thereof to the control location with a communications network and comprising:

means for sensing changes in electric power at the remote location from a first state, when electric power is present, to a second state, when electric power is interrupted; and means responsive to said sensed changes in the electric power for transmitting to the control location with the communications network during the second state data indicating the electric power is interrupted and data indicating the address of the remote location.

25. The apparatus according to claim 24 wherein the means for sensing electric power includes means for continuously monitoring the presence of electric power at the remote location.

26. The apparatus according to claim 24 further including means for receiving a signal from the control location confirming receipt of an indication of the change of electric power.

27. The apparatus according to claim 24 wherein the means for sensing changes in the electric power from the first state to the second state further includes:

means for indicating a return to the first state at the remote location;

means for testing the communications line and for generating a line availability signal in response to a return of condition to the first state;

means for seizing the communications line in response to a line availability signal;

means for transmitting onto the line data signals representative of a second telephone number to address a second control location; and means for transmitting data uniquely identifying the remote location originating the call on the communications line after communication with the control location has been established;

whereby the second control location is informed of the return to the first state upon receipt of data signals representative of a second telephone number.

28. The apparatus according to claim 24 further including means for randomly selecting a delay time between a predetermined minimum and a predetermined maximum in response to a change in the presence of electric power to the second state.

29. An apparatus for monitoring a presence of electrical power at a location remote from a central location, and for delivering notification of a change in the status thereof to the control location via a telephone network, the apparatus comprising:

means for sensing an electrical power interruption at the remote location;

means responsive to a change in the electrical power at the remote location for waiting a randomly selecting a delay time;

means responsive to the waiting means waiting the randomly selective a delay time and response to an availability of a telephone line on the network for seizing the telephone line;

means for indicating to the control location via the telephone network that power has been interrupted at the remote location.

30. The apparatus according to claim 29 wherein said delay time is between a preselected minimum and a preselected maximum.

31. The apparatus according to claim 30 wherein the randomly selected delay time is between 60 and 360 seconds.

32. The apparatus according to claim 29 further including means for receiving a confirmation signal from the selected one of said first and second control locations confirming receipt of the coded identifying signal.

33. The apparatus according to claim 29 further comprising means for testing the telephone line and for generating an indicia of telephone line availability or non-availability, wherein the means for randomly selecting a delay time is responsive to indicia of line non-availability and has a means for waiting a second randomly selected delay period that is longer than the first delay period.

34. An apparatus for monitoring for the presence of electrical power at a remote location and communicating data related to changes in the status of the electrical power from a first state where power is present to a different state where power has been interrupted, to a central location over a telephone line, the apparatus comprising:

sensor means for monitoring the electrical power at the remote locations, said sensor means located at the remote location and obtaining it operating power from an electrical power supply when the power supply is in the first state and to obtain its operating power from the telephone line when the electrical power is in the different state;

delay means for waiting a first randomly selected delay period in response to a change in the condition to the different state;

means for testing the telephone line and for generating a line availability signal in response to a change in the condition to the different state and in response to an expiration of the first randomly selected delay period;

means for seizing the telephone line in response to the line availability signal;

means for transmitting onto the seized line data signals representative of the remote location identifying address (IA); and means for transmitting data uniquely identifying the presence or absence of electric power at the remote location originating the call on the telephone line after communication with the control location has been established and for disconnecting the line upon completion of data transmission.

35. The apparatus according to claim 34 wherein the sensor means continuously monitors the state of the electrical power.

36. The apparatus according to claim 35 wherein the first randomly selected delay period is between a preselected minimum time period and a preselected maximum time period.

* * * * *

UNITED STATES PATENT AND TRADEMARK OFFICE
CERTIFICATE OF CORRECTION

PATENT NO. : 5,784,441
DATED : July 21, 1998
INVENTOR(S) : Glenn Albert Davis, et. al.

It is certified that error appears in the above-identified patent and that said Letters Patent is hereby corrected as shown below:

Col. 4, line 37, delete "FIG. 2 is" and insert --FIGS. 2A, 2B, 2C and 2D are--

Col. 4, line 39, delete "FIG. 3 is" and insert --FIGS. 3A, 3B, 3C, and 3D are--

Col. 5, line 9, delete "diagram of FIG. 2" and insert --diagrams of FIGS. 2A, 2B, 2C, and 2D--

Col. 5, line 11, delete "diagram of FIG. 3" and insert --diagrams of FIGS. 3A, 3B, 3C, and 3D--

Col. 9, line 33, delete "FIG. 3" and insert --FIGS. 3A, 3B, 3C, and 3D--

Signed and Sealed this

Ninth Day of February, 1999

Attest:

Attesting Officer

*Acting Commissioner of Patents and Trademarks*